US012361533B2

(12) United States Patent
Nitto

(10) Patent No.: US 12,361,533 B2
(45) Date of Patent: Jul. 15, 2025

(54) IMAGE PROCESSING APPARATUS AND IMAGE PROCESSING METHOD

(71) Applicant: CANON KABUSHIKI KAISHA, Tokyo (JP)

(72) Inventor: Yuuichi Nitto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 383 days.

(21) Appl. No.: 17/966,123

(22) Filed: Oct. 14, 2022

(65) Prior Publication Data
US 2023/0130917 A1    Apr. 27, 2023

(30) Foreign Application Priority Data

Oct. 22, 2021  (JP) ................................. 2021-173413

(51) Int. Cl.
| | |
|---|---|
| *G06T 3/40* | (2024.01) |
| *G06T 5/77* | (2024.01) |
| *G06T 7/00* | (2017.01) |
| *G06T 7/60* | (2017.01) |

(52) U.S. Cl.
CPC ............ *G06T 7/0004* (2013.01); *G06T 3/40* (2013.01); *G06T 5/77* (2024.01); *G06T 7/60* (2013.01); *G06T 2207/20081* (2013.01); *G06T 2207/20092* (2013.01); *G06T 2207/30108* (2013.01)

(58) Field of Classification Search
CPC ........... G06T 7/0004; G06T 3/40; G06T 5/77; G06T 7/60; G06T 7/001
See application file for complete search history.

(56) References Cited

U.S. PATENT DOCUMENTS

| | | | |
|---|---|---|---|
| 2018/0107928 A1* | 4/2018 | Zhang | ................... G06N 3/082 |
| 2021/0209422 A1* | 7/2021 | Horita | .................... G06V 10/50 |
| 2021/0312605 A1* | 10/2021 | Nogami | ............... G06T 7/0004 |

FOREIGN PATENT DOCUMENTS

| | | |
|---|---|---|
| JP | 6474946 B1 | 2/2019 |
| WO | 2019/003355 A1 | 1/2019 |

OTHER PUBLICATIONS

Adhikari, R. S., Moselhi, O., & Bagchi, A. (2014). Image-based retrieval of concrete crack properties for bridge inspection. Automation in Construction, 39, 180-194. https://doi.org/10.1016/j.autcon.2013.06.011 (Year: 2014).*

Mohan, A., & Poobal, S. (2018). Crack detection using image processing: A critical review and analysis. Alexandria Engineering Journal, 57(2), 787-798. https://doi.org/10.1016/j.aej.2017.01.020 (Year: 2018).*

(Continued)

*Primary Examiner* — Gregory A Morse
*Assistant Examiner* — David Alexander Wambst
(74) *Attorney, Agent, or Firm* — Carter, DeLuca & Farrell LLP

(57) ABSTRACT

An image processing apparatus comprises an obtainment unit configured to obtain first actual size information of an image including a defect, and a determination unit configured to determine an attribute of the defect included in the image using the first actual size information and a model generated by learning in advance.

18 Claims, 9 Drawing Sheets

(56) References Cited

OTHER PUBLICATIONS

Ali, L., Alnajjar, F., Jassmi, H. A., Gocho, M., Khan, W., & Serhani, M. A. (2021). Performance Evaluation of Deep CNN-Based Crack Detection and Localization Techniques for Concrete Structures. Sensors, 21(5), 1688. https://doi.org/10.3390/s21051688 (Year: 2021).*

Fan, R., Junaid, B. M., Zhu, Y., Jiao, J., Wang, L., Ma, F., Cheng, S., & Liu, M. (2019). Road Crack Detection Using Deep Convolutional Neural Network and Adaptive Thresholding. ArXiv.org. https://arxiv.org/abs/1904.08582 (Year: 2019).*

Dung, C. V., & Anh, L. D. (2019). Autonomous concrete crack detection using deep fully convolutional neural network. Automation in Construction, 99, 52-58. https://doi.org/10.1016/j.autcon.2018.11.028 (Year: 2019).*

Han, X., Zhang, Z., Ding, N., Gu, Y., Liu, X., Huo, Y., Qiu, J., Zhang, L., Han, W., Huang, M., Jin, Q., Lan, Y., Liu, Y., Liu, Z., Lu, Z., Qiu, X., Song, R., Tang, J., Wen, J.-R., (Aug. 2021). Pre-Trained Models: Past, Present and Future. AI Open, 2. https://doi.org/10.1016/j.aiopen.2021 (Year: 2021).*

* cited by examiner

F I G. 2
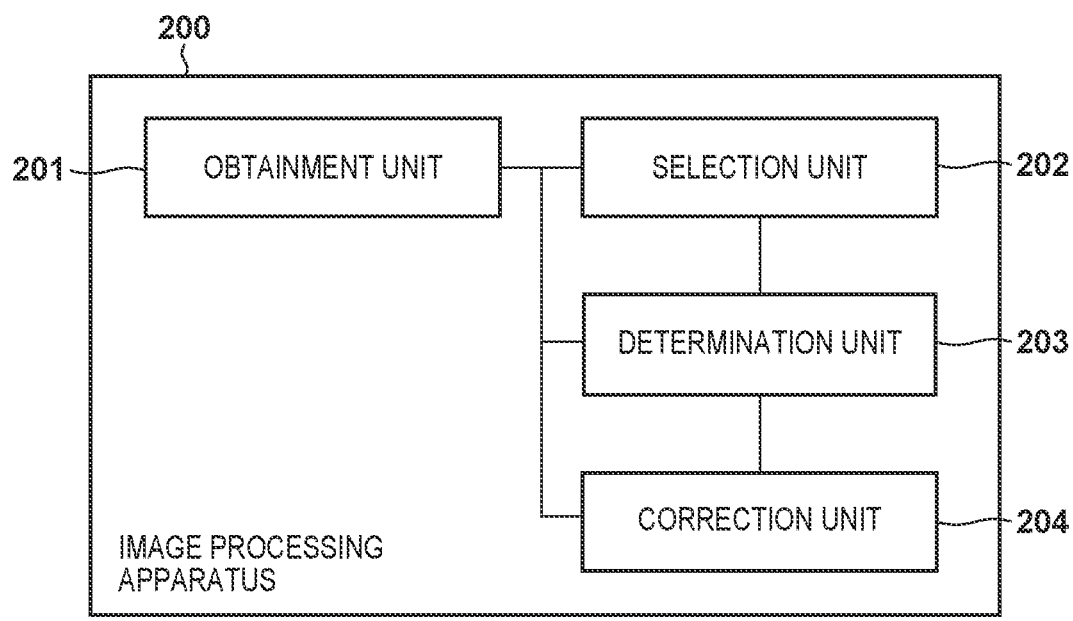

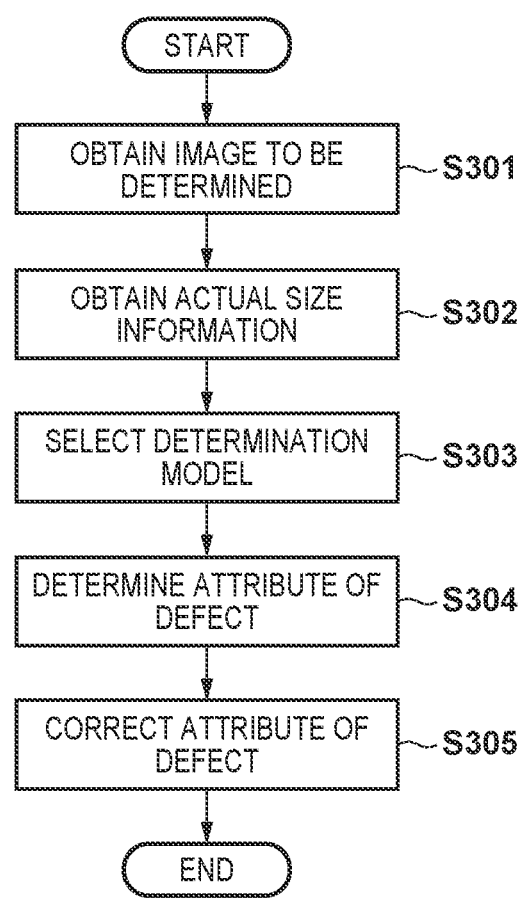

FIG. 5

| MODEL ID | MODEL FILE NAME | MODEL ACTUAL SIZE INFORMATION |
|---|---|---|
| M01 | m01.dat | 1.0 |
| M02 | m02.dat | 0.8 |
| ... | ... | ... |
| M05 | m05.dat | 1.5 |

FIG. 6A

| DEFECT ID | START POINT COORDINATES | END POINT COORDINATES | DEFECT ATTRIBUTE |
|---|---|---|---|
| C0001 | (103,100) | (100,112) | 0.10 |
| C0002 | (102,105) | (114,107) | 0.15 |
| C0003 | (321,103) | (342,105) | 0.05 |
| ... | ... | ... | ... |
| C0100 | (587,394) | (597,396) | 0.2 |

FIG. 6B

| DEFECT ID | START POINT COORDINATES | END POINT COORDINATES | DEFECT ATTRIBUTE | CORRECTED DEFECT ATTRIBUTE |
|---|---|---|---|---|
| C0001 | (103,100) | (100,112) | 0.10 | 0.15 |
| C0002 | (102,105) | (114,107) | 0.15 | 0.225 |
| C0003 | (321,103) | (342,105) | 0.05 | 0.075 |
| ... | ... | ... | ... | ... |
| C0100 | (587,394) | (597,396) | 0.2 | 0.3 |

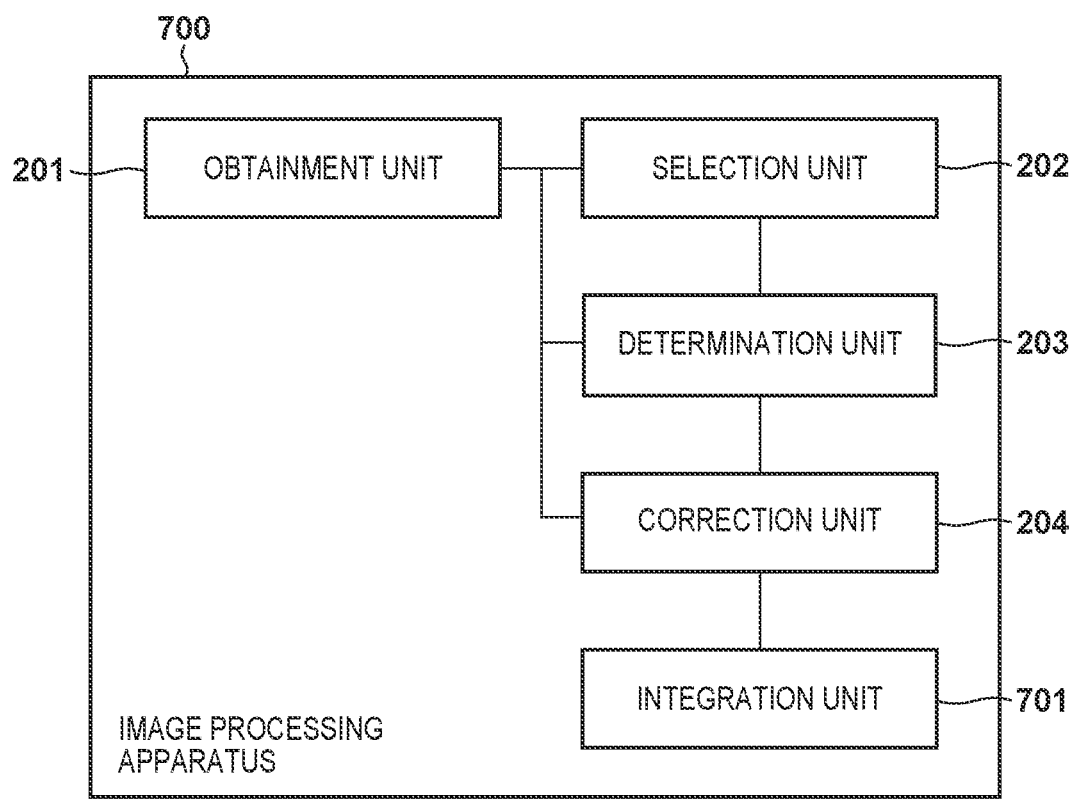

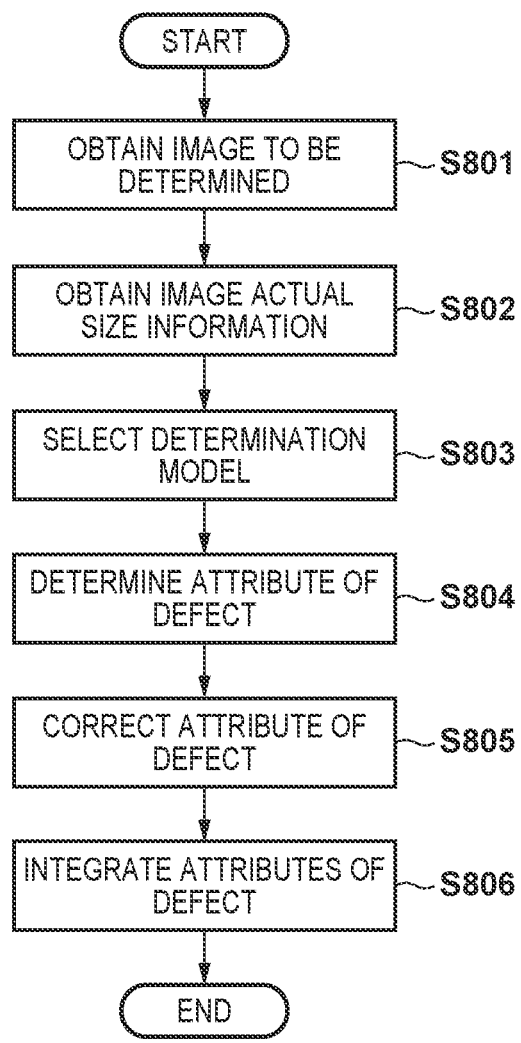

FIG. 9

| MODEL ID | MODEL ACTUAL SIZE INFORMATION | IMAGE ACTUAL SIZE INFORMATION |
|---|---|---|
| M01 | 1.0 | 0.9 |
| M02 | 0.8 | 0.9 |

FIG. 10A

| DEFECT ID | MODEL ID | START POINT COORDINATES | END POINT COORDINATES | DEFECT ATTRIBUTE |
|---|---|---|---|---|
| C0001 | M01 | (103,100) | (100,112) | 0.10 |
| C0002 | M01 | (102,105) | (114,107) | 0.15 |
| C0001 | M02 | (103,100) | (100,112) | 0.14 |
| ... | ... | ... | ... | ... |
| C0100 | M02 | (587,394) | (597,396) | 0.2 |

FIG. 10B

| DEFECT ID | MODEL ID | START POINT COORDINATES | END POINT COORDINATES | DEFECT ATTRIBUTE | CORRECTED DEFECT ATTRIBUTE |
|---|---|---|---|---|---|
| C0001 | M01 | (103,100) | (100,112) | 0.10 | 0.15 |
| C0002 | M01 | (102,105) | (114,107) | 0.15 | 0.225 |
| C0003 | M02 | (103,100) | (100,112) | 0.14 | 0.14 |
| ... | ... | ... | ... | ... | ... |
| C0100 | M02 | (587,394) | (597,396) | 0.2 | 0.3 |

IMAGE PROCESSING APPARATUS AND IMAGE PROCESSING METHOD

BACKGROUND OF THE INVENTION

Field of the Invention

The present invention relates to an image processing technique for detecting a defect from an image in which an inspection target is shot.

Description of the Related Art

There is a method for detecting a defect, such as a crack, as well as determining an attribute of a defect, such as a width of a crack, in an image in which an inspection target, such as a wall surface of a concrete structure, has been shot, by a computer apparatus performing machine learning. When determining an attribute of a defect by machine learning, a learned model is generated using learning data as input; however, when contents of the learning data are different, models whose characteristics are different are generated. In order to improve determination accuracy, it is desirable to generate a plurality of models whose characteristics are different and select an appropriate model in accordance with a determination target.

As a method for selecting a learned model to be used in an analysis of an image, Japanese Patent No. 6474946 describes a method for selecting a model that has been learned with images whose image capturing conditions are similar to the image capturing conditions, which include an image capturing position and an image capturing angle, of that image.

As described above, when there are a plurality of models whose learning data contents are different, it is desirable to select a model that has been learned with learning data that is as similar as possible to the data that is a determination target. In particular, when determining a width of a defect or the like, since a determination result is an actual size (e.g., mm), it is desirable to select a model learned with learning data whose actual size per pixel in an image is similar.

However, the conditions for selecting a model in Japanese Patent No. 6474946 are only similarities of an image capturing position and an image capturing angle of an image, and an actual size of the image is not considered. In addition, when a similarity to learning data is low, it is difficult to perform determination with good accuracy, and in order to perform determination for various images, it is necessary to prepare various models whose learning data contents are different.

SUMMARY OF THE INVENTION

The present invention has been made in consideration of the aforementioned problems, and realizes techniques for enabling determination of an attribute of a defect using actual size information of an image while maintaining determination accuracy.

In order to solve the aforementioned problems, the present invention provides an image processing apparatus comprising: an obtainment unit configured to obtain first actual size information of an image including a defect; and a determination unit configured to determine an attribute of the defect included in the image using the first actual size information and a model generated by learning in advance.

In order to solve the aforementioned problems, the present invention provides an image processing method comprising: obtaining first actual size information of an image including a defect; and determining an attribute of the defect included in the image using the first actual size information and a model generated by learning in advance.

In order to solve the aforementioned problems, the present invention provides a non-transitory computer-readable storage medium storing a program for causing a processor to function as an image processing apparatus comprising: an obtainment unit configured to obtain first actual size information of an image including a defect; and a determination unit configured to determine an attribute of the defect included in the image using the first actual size information and a model generated by learning in advance.

According to the present invention, it becomes possible to determine an attribute of a defect using actual size information of an image while maintaining determination accuracy.

Further features of the present invention will become apparent from the following description of exemplary embodiments (with reference to the attached drawings).

BRIEF DESCRIPTION OF THE DRAWINGS

FIG. 2 is a block diagram illustrating a functional configuration of the image processing apparatus according to the first embodiment.

FIG. 3 is a flowchart illustrating processing for determining an attribute of a defect in the image processing apparatus according to the first embodiment.

FIG. 5 is a diagram exemplifying a database generated by the image processing apparatus according to the first embodiment.

FIGS. 6A and 6B are diagrams exemplifying databases generated by the image processing apparatus according to the first embodiment.

FIG. 7 is a block diagram illustrating a functional configuration of an image processing apparatus according to a second embodiment.

FIG. 8 is a flowchart illustrating processing of the image processing apparatus according to the second embodiment.

FIG. 9 is a diagram exemplifying a database generated by the image processing apparatus according to the second embodiment.

FIGS. 10A and 10B are diagrams exemplifying databases generated by the image processing apparatus according to the second embodiment.

DESCRIPTION OF THE EMBODIMENTS

Figure 1:
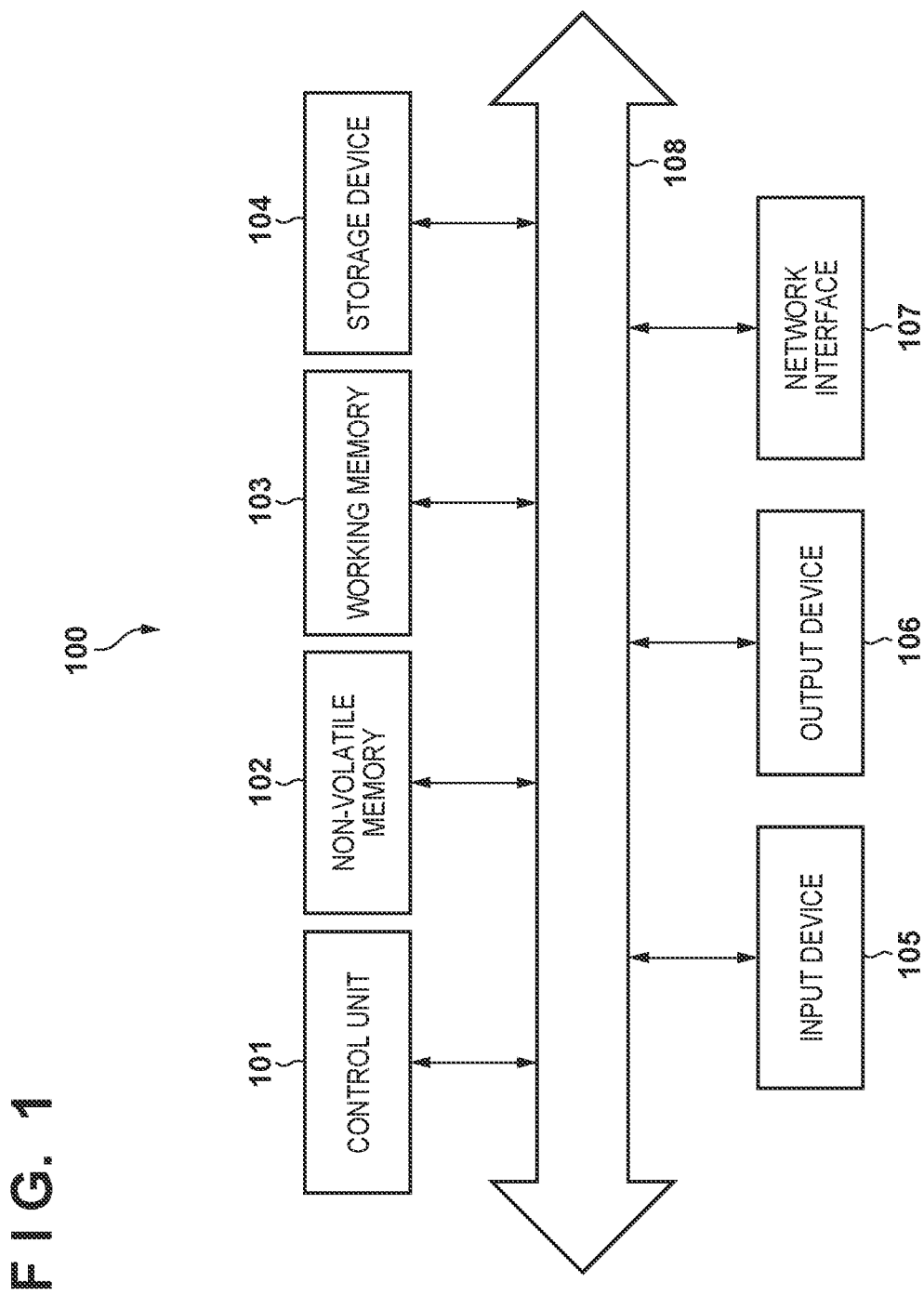
FIG. 1 is a block diagram illustrating a hardware configuration of an image processing apparatus according to a first embodiment.

Hereinafter, embodiments will be described in detail with reference to the accompanying drawings. The following embodiments do not limit the claimed invention. Although a plurality of features are described in the embodiments, not all of these plurality of features are essential to the invention; also, a plurality of features may be arbitrarily combined. Furthermore, in the accompanying drawings, the same or similar configurations are assigned the same reference numerals, and redundant description will be omitted.

First Embodiment

In a first embodiment, a description will be given for an example in which a computer apparatus operates as an image processing apparatus and performs processing for performing machine learning based on an image (image to be determined) including a defect, which is an inspection target; actual size information; and a single determination model for determining a defect attribute.

A defect is a crack or the like occurring on a surface of concrete due to damage, deterioration, and the like of a concrete structure, such as an automobile road, bridge, tunnel, or dam; a crack is a line-shaped damage with a start point, an end point, a length, and a width occurring on a wall surface or the like of a structure due to aging degradation, an impact of an earthquake, or the like.

<Hardware Configuration>

First, a hardware configuration of an image processing apparatus according to a first embodiment will be described with reference to FIG. 1.

FIG. 1 is a block diagram illustrating a hardware configuration of an image processing apparatus 100 according to the first embodiment.

In first and second embodiments to be described below, a computer apparatus operates as the image processing apparatus 100. Processing of the image processing apparatus of the present embodiment may be implemented by a single computer apparatus or may be implemented by distributing respective functions among a plurality of computer apparatuses as necessary. The plurality of computer apparatuses are connected so as to be capable of communicating with each other.

The image processing apparatus 100 includes a control unit 101, a non-volatile memory 102, a working memory 103, a storage device 104, an input device 105, an output device 106, a network interface 107, and a system bus 108.

The control unit 101 includes a computational processor, such as a CPU or a MPU for collectively controlling the entire image processing apparatus 100. The non-volatile memory 102 is a ROM for storing programs to be executed by the processor of the control unit 101 and parameters. Here, the programs are programs for executing processing of the first and second embodiments, which will be described later. The working memory 103 is a RAM for temporarily storing programs and data supplied from an external apparatus or the like. The storage device 104 is an internal device, such as a hard disk or a memory card built in the image processing apparatus 100, or an external device, such as a hard disk or a memory card connected so as to be capable of being attached to and detached from the image processing apparatus 100. The storage device 104 includes a memory card, a hard disk, or the like configured by a semiconductor memory, a magnetic disk, or the like. The storage device 104 also includes a storage medium configured by a disk drive for reading and writing data to and from an optical disk, such as a DVD or a Blue-ray Disc.

The input device 105 is an operation member, such as a mouse, a keyboard, or a touch panel that accepts a user operation, and outputs an operation instruction to the control unit 101. The output device 106 is a display apparatus, such as a display or a monitor configured by a Liquid Crystal Display (LCD) or an organic Electro Luminescence (EL), and displays data held by the image processing apparatus 100 or data supplied from an external device. The network interface 107 is connected so as to be capable of communicating with a network, such as the Internet or a Local Area Network (LAN). The system bus 108 includes an address bus, a data bus, and a control bus that connect the respective components 101 to 107 of the image processing apparatus 100 so as to be capable of exchanging data.

The non-volatile memory 102 stores an operating system (OS), which is basic software to be executed by the control unit 101, and applications, which realize applicative functions in cooperation with the OS. Further, in the present embodiment, the non-volatile memory 102 stores an application for the image processing apparatus 100 to realize processing for determining an attribute of a defect from an image to be determined, which will be described later.

Processing of the image processing apparatus 100 of the present embodiment is realized by reading software provided by an application. It is assumed that the application includes software for utilizing the basic functions of the OS installed in the image processing apparatus 100. The OS of the image processing apparatus 100 may include software for realizing processing in the present embodiment.

<Functional Configuration>

Next, functional configurations of the image processing apparatus according to the first embodiment will be described with reference to FIG. 2.

FIG. 2 is a block diagram illustrating a functional configuration of an image processing apparatus 200 according to the first embodiment.

The image processing apparatus 200 includes an obtainment unit 201, a selection unit 202, a determination unit 203, and a correction unit 204. Each function of the image processing apparatus 200 is configured by hardware and software. Each functional unit may be configured as a system configured by one or more computer apparatuses or server apparatuses and connected by a network.

The obtainment unit 201 obtains an image to be determined for which an attribute of a defect will be determined and actual size information per pixel of the image to be determined. An image to be determined and actual size information are read from the storage device 104, is inputted by the input device 105, or is received from an external device via the network interface 107.

The selection unit 202 selects a learned model or a parameter to be used for determining an attribute of a defect based on an image to be determined and actual size information obtained by the obtainment unit 201.

The determination unit 203 performs machine learning based an image to be determined and actual size information obtained by the obtainment unit 201 and a determination model selected by the selection unit 202 to determine an attribute of a defect.

The correction unit 204 corrects an attribute of a defect based on actual size information per pixel of an image to be determined obtained by the obtainment unit 201 and an attribute of a defect determined by the determination unit 203.

Actual size information per pixel is a conversion value representing an actual size value (e.g., mm) per pixel of an image to be determined and is an image-actual size ratio representing a ratio between a pixel and an actual size value (mm/pixel). In addition to the image-actual size ratio, the actual size information is also referred to as an actual size conversion of an image, a resolution, a pixel actual size value, an image actual size value, and the like.

Further, in the present embodiment, an example in which a width of a defect is determined as an attribute of a defect is described, however, the present invention is not limited to this, and a length, a depth, a thickness, a surface area, a volume, or the like of a defect may be determined.

<Processing for Determining Attribute of Defect>

Next, processing in which the image processing apparatus 100 according to the first embodiment determines an attribute of a defect from an image to be determined will be described with reference to FIGS. 3 to 6B.

FIG. 3 is a flowchart illustrating processing in which the image processing apparatus 100 according to the first embodiment determines an attribute of a defect from an image to be determined.

The processing of FIG. 3 is realized by the control unit 101 of the image processing apparatus 100 illustrated in FIG. 1 deploying a program stored in the non-volatile memory 102 in the working memory 103, executing the program, and controlling the respective components, thereby executing the functions illustrated in FIG. 2. The same applies to FIG. 8, which will be described later.

In step S301, the obtainment unit 201 obtains an image to be determined for which an attribute of a defect will be determined.

In step S302, the obtainment unit 201 obtains actual size information (hereinafter, image actual size information) of the image to be determined obtained in step S301. A plurality of pieces of image actual size information may be obtained, and image actual size information for each of vertical and horizontal directions may be obtained.

FIGS. 4A to 4D are diagrams illustrating methods for obtaining image actual size information of an image to be determined and exemplify display screens of the image processing apparatus 100.

Figure 4A:
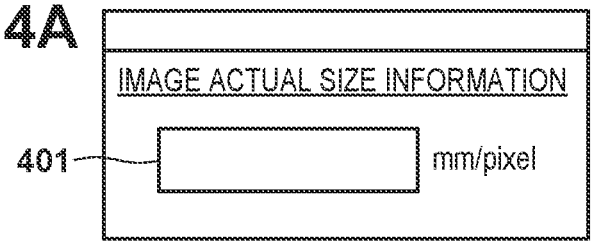
FIGS. 4A to 4D are diagrams exemplifying UI screens of the image processing apparatus according to the first embodiment.
Figure 4B:
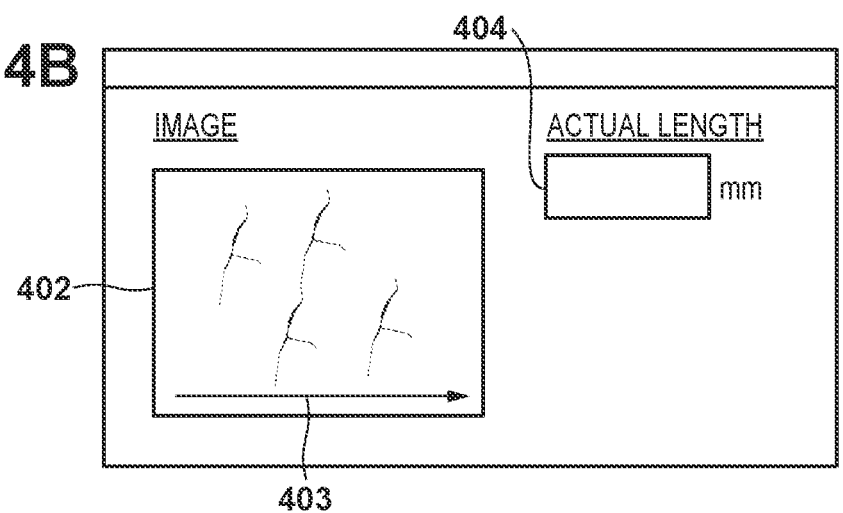
Figure 4C:
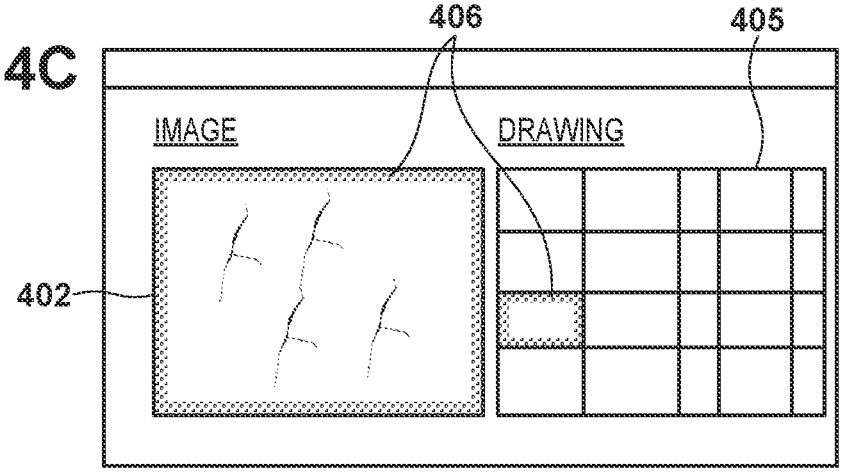
Figure 4D:
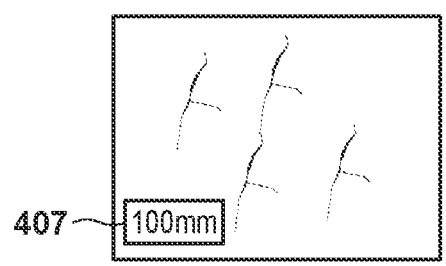

Image actual size information can be obtained, for example, by a user inputting an actual size value into an input field 401 of a display screen illustrated in FIG. 4A by operating the input device 105. Further, image actual size information can be obtained, for example, by the user inputting a numerical value corresponding to a length of a line segment 403 displayed on an image to be determined 402 into an input field 404 of a display screen illustrated in FIG. 4B by operating the input device 105. Further, as in a display screen illustrated in FIG. 4C, image actual size information can be obtained by a drawing 405, in which the image to be determined 402 and an actual size value are associated with each other, being displayed and the user associating a relationship 406 between the image to be determined 402 and the drawing 405 by operating the input device 105. Furthermore, as in a display screen illustrated in FIG. 4D, image actual size information can be obtained by selecting an image to be determined whose actual size value 407 is known. A plurality of pieces of image actual size information may be obtained. For example, actual size information in the vertical and horizontal directions may be obtained by displaying, in the display screen illustrated in FIG. 4C, the drawing 405 in which the image to be determined 402 and actual size information in the vertical and horizontal directions are associated and associating the relationship 406 of the image to be determined 402 and the drawing 405.

In step S303, the selection unit 202 selects a determination model to be used for determining an attribute of a defect from the image to be determined.

A determination model is generated in advance by learning an image (defect image) including actual size information and a defect that is close to the actual size information. The determination model stores the actual size information of the defect image used for learning in association therewith. FIG. 5 is a diagram exemplifying a part of a database of determination models, one of which is selected in step S303. A determination model database 501 illustrated in FIG. 5 is stored in an external storage apparatus, which can be accessed via the storage device 104 or the network interface 107. In FIG. 5, the determination model database 501 stores a model ID 502, a model file name 503, and model actual size information 504 for each determination model. The model ID 502 is identification information of a determination model. The model file name 503 is a name of a data file of a determination model. The model actual size information 504 is actual size information of a defect image used for learning and, in the present embodiment, is an image-actual size ratio.

The selection unit 202 selects a determination model that is the closest to the image actual size information obtained in step S302 from the database illustrated in FIG. 5.

A method for selecting a determination model is as follows.

First, a distance f(n) is calculated using the following Formula 1. Rt is the image actual size information obtained in step S302, and Rn is model actual size information of a determination model n.

$$f(n)=|Rt-Rn| \qquad \text{(Formula 1)}$$

Next, a determination model whose distance f(n) calculated using Formula 1 is the smallest is selected. When there are a plurality of determination models whose distances are the smallest, a determination model whose model actual size information is the smallest may be selected. Further, when a plurality of pieces of image actual size information are obtained in step S302, a determination model may be selected using their average as the image actual size information.

In step S304, the determination unit 203 performs machine learning based on the image to be determined and the image actual size information obtained in steps S301 and S302 and the determination model selected in step S303 to determine an attribute of a defect. The determination unit 203 may determine the attribute of the defect using position information of the defect in addition to the image actual size information. Here, the position of the defect may be detected by the user from the image to be determined and inputted using the input device 105 or may be detected by an external device and inputted through the network interface 107.

FIG. 6A is a diagram exemplifying a part of a database of attributes of defects outputted as a result of the determination in step S304. A defect attribute database 601 illustrated in FIG. 6A is stored in an external storage apparatus, which can be accessed via the storage device 104 or the network interface 107. In FIG. 6A, the defect attribute database 601 stores a defect ID 602, start point coordinates 603, end point coordinates 604, and a defect attribute 605 for each determined defect. The defect ID 602 is identification information of a determined defect. The start point coordinates 603 are start point coordinates of a position of a determined defect. The end point coordinates 604 are end point coordinates of a position of a determined defect. The defect attribute 605 is an attribute of a determined defect and, in the present embodiment, is a width of a defect.

In step S305, the correction unit 204 corrects the attribute of the defect determined in step S304.

A method for correcting an attribute of a defect is as follows.

First, a correction coefficient α is calculated using the following Formula 2. Rt is the image actual size information obtained in step S302, and Rn is model actual size information of a determination model n.

$$\alpha=Rt/Rn \qquad \text{(Formula 2)}$$

Next, an attribute Cn of a defect determined in step S304 is corrected using the correction coefficient α calculated using Formula 2.

Then, a corrected attribute C'n of the defect is calculated by the following Formula 3.

$$C'n = \alpha \cdot Cn \quad \text{(Formula 3)}$$

The above correction is performed for each defect attribute determined in step S304 and registered in the database 601 illustrated in FIG. 6A. The corrected defect attributes are registered in a corrected defect attribute database 606 illustrated in FIG. 6B. FIG. 6B is a diagram exemplifying a part of a defect attribute database corrected in step S305. The corrected defect attribute database 606 illustrated in FIG. 6B is stored in an external storage apparatus, which can be accessed via the storage device 104 or the network interface 107. In FIG. 6B, the corrected defect attribute database 606 stores the defect ID 602, the start point coordinates 603, the end point coordinates 604, the defect attribute 605, and a corrected defect attribute 607 for each corrected defect. The defect ID 602 is identification information of a corrected defect. The start point coordinates 603 are start point coordinates of a position of a corrected defect. The end point coordinates 604 are end point coordinates of a position of a corrected defect. The defect attribute 605 is an attribute of a corrected defect. The corrected defect attribute 607 is a corrected defect attribute and, in the present embodiment, is a width of a defect.

Further, when a plurality of pieces of image actual size information are obtained in step S302, an attribute of a defect may be corrected using their average as the image actual size information.

As described above, according to the first embodiment, it is possible to determine an attribute of a defect using actual size information of an image to be determined, while maintaining determination accuracy. This improves a reliability of processing for determining an attribute of a defect, which makes it possible to optimize inspection work.

Step S303 or S305 may be omitted. For example, the selection of a determination model in step S303 may be omitted, and a predetermined, typical determination model may be used. Alternatively, the correction of an attribute of a defect in step S305 may be omitted.

Further, in the determination of an attribute of a defect in step S304, an attribute of a defect may be determined after an image to be determined has been resized so that image actual size information of the image to be determined and the model actual size information of a determination model coincide.

Further, when a plurality of pieces of image actual size information are obtained or image actual size information includes image actual size information in the vertical and horizontal directions, it need only be that processing from step S303 to step S305 is performed for each piece of image actual size information.

Second Embodiment

Next, a second embodiment will be described with reference to FIGS. 7 to 11B.

The first embodiment is processing for performing machine learning based on an image to be determined, image actual size information, and a single determination model to determine an attribute of a defect. In contrast, in the second embodiment, a description will be given for an example of processing for determining an attribute of a defect using a plurality of determination models and integrating a plurality of defect attributes obtained using the plurality of determination models.

<Apparatus Configuration>

FIG. 7 is a block diagram illustrating a functional configuration of an image processing apparatus according to the second embodiment. Regarding an image processing apparatus 700 according to the second embodiment, an integration unit 701 has been added to the image processing apparatus 200 of FIG. 2 described in the first embodiment.

The integration unit 701 integrates a plurality of defect attributes determined by the correction unit 204 using a plurality of determination models.

A hardware configuration of the image processing apparatus 700 according to the second embodiment is the same as that of FIG. 1 according to the first embodiment.

<Processing for Determining Attribute of Defect>

Next, processing in which the image processing apparatus 70) of the second embodiment determines an attribute of a defect from an image to be determined will be described with reference to FIGS. 8 to 11B.

FIG. 8 is a flowchart illustrating processing in which the image processing apparatus 700 according to the second embodiment determines an attribute of a defect from an image to be determined.

Processing in steps S801 and S802 in FIG. 8 is similar to the processing in steps S301 and S302 of FIG. 3 described in the first embodiment. As described in the first embodiment, a plurality of pieces of image actual size information may be obtained, and image actual size information for each of vertical and horizontal directions may be obtained.

In step S803, the selection unit 202 selects a plurality of determination models to be used for determining an attribute of a defect from the image to be determined.

The selection unit 202 calculates the distance f(n) using Formula 1 described in the first embodiment and selects N (e.g., N=2) determination models from the database illustrated in FIG. 5 in order starting with the one closest to the calculated distance f(n). When a plurality of pieces of image actual size information is obtained in step S802, the distance f(n) is calculated for each of the image actual size information, and a determination model whose distance f(n) is the smallest among the respective distances f(n) is selected.

The selected determination model (hereinafter, selected model) stores the image actual size information of the image to be determined obtained in step S802 in association therewith. FIG. 9 is a diagram exemplifying a part of a database of models selected in step S803. A selected model database 901 illustrated in FIG. 9 is stored in an external storage apparatus, which can be accessed via the storage device 104 or the network interface 107. In FIG. 9, the selected model database 901 stores a model ID 902, model actual size information 903, and image actual size information 904 for each selected model. The model ID 902 is identification information of a selected model. The model actual size information 903 is actual size information of a defect image used for learning; the image actual size information 904 is image actual size information of the image to be determined obtained in step S802 and, in the present embodiment, is an image-actual size ratio.

In step S804, the determination unit 203 determines an attribute of a defect using the respective models selected in step S803. A method for determining an attribute of a defect is the same as in step S304 of FIG. 3. FIG. 10A is a diagram exemplifying a part of a database of attributes of defects outputted as a result of the determination in step S804. A defect attribute database 1001 illustrated in FIG. 10A is stored in an external storage apparatus, which can be accessed via the storage device 104 or the network interface 107. In FIG. 10A, the defect attribute database 1001 stores a defect ID 1002, a model ID 1003, start point coordinates 1004, end point coordinates 1005 and a defect attribute 1006 for each determined defect. The defect ID 1002 is identification information of a determined defect. The model ID 1003 is identification information of a selected model used for determining an attribute of a defect. The start point coordinates 1004 are start point coordinates of a position of a determined defect. The end point coordinates 1005 are end point coordinates of a position of a determined defect. The defect attribute 1006 is an attribute of a determined defect and, in the present embodiment, is a width of a defect. In FIG. 10A, regarding a defect 1007 and a defect 1008, an attribute of a defect is determined using different determination models for a defect of the same position; therefore, the same defect ID 1002 and different model IDs 1003 are registered.

In step S805, the correction unit 204 corrects the attributes of the defect determined in step S804. Regarding the model ID 1003 for each defect ID of the database 1001 illustrated in FIG. 10A, the correction unit 204 obtains model actual size information and image actual size information of a selected model used for determining an attribute of a defect by referring to the selected model database 901 illustrated in FIG. 9. Further, the correction unit 204 calculates the correction coefficient α using Formula 2 described in the first embodiment and corrects the attribute Cn of the defect using Formula 3 described in the first embodiment.

The above correction is performed for each defect attribute determined in step S804 and registered in the database 1001 illustrated in FIG. 10A. The corrected defect attributes are registered in a corrected defect attribute database 1009 illustrated in FIG. 10B. FIG. 10B is a diagram exemplifying a part of a defect attribute database corrected in step S805. The corrected defect attribute database 1009 illustrated in FIG. 10B is stored in an external storage apparatus, which can be accessed via the storage device 104 or the network interface 107. In FIG. 10B, the corrected defect attribute database 1009 stores the defect ID 1002, the model ID 1003, the start point coordinates 1004, the end point coordinates 1005, the defect attribute 1006, and a corrected defect attribute 1010 for each corrected defect. The defect ID 1002 is identification information of a corrected defect. The model ID 1003 is identification information of a selected model used for determining an attribute of a defect. The start point coordinates 1004 are start point coordinates of a position of a corrected defect. The end point coordinates 1005 are end point coordinates of a position of a corrected defect. The defect attribute 1006 is an attribute of a corrected defect. The corrected defect attribute 1010 is a corrected defect attribute and, in the present embodiment, is a width of a defect.

Figure 11A:
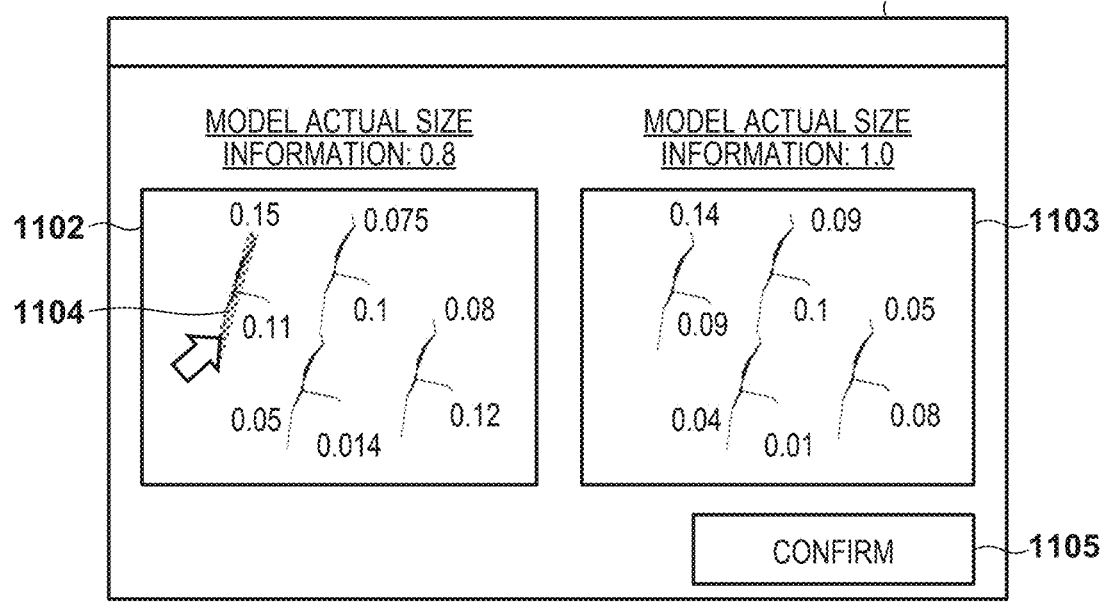
FIGS. 11A and 11B are diagrams exemplifying UI screens of the image processing apparatus according to the second embodiment.
Figure 11B:
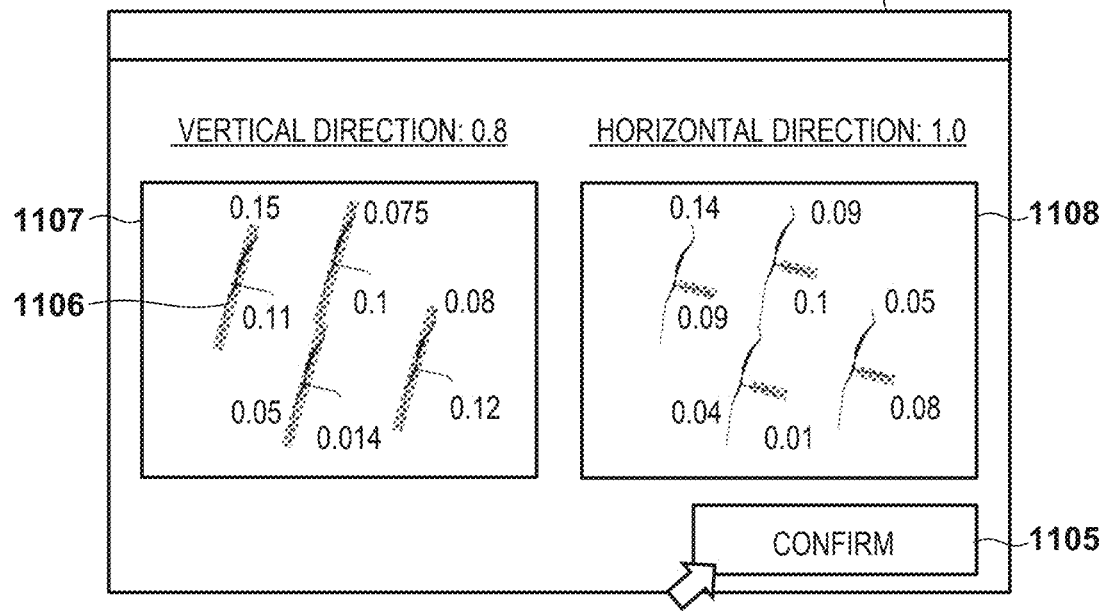

In step S806, the integration unit 701 integrates the plurality of defect attributes determined using the plurality of selected models and corrected in step S805. The integration unit 701 integrates, for example, a plurality of defect attributes determined using different selected models and then corrected into a corrected defect attribute specified by the user. FIGS. 11A and 11B are diagrams illustrating methods for integrating a plurality of corrected defect attributes determined using a plurality of selected models. In an integration screen 1101 illustrated in FIG. 11A, each defect registered in the database 1009 of FIG. 10B and corrected defect attributes determined by using different selected models for respective defects are displayed on the image to be determined obtained in step S801. FIG. 11A displays, on the integration screen 1101, for example, an image to be determined 1102 including a plurality of defect attributes determined using a selected model, which is registered in the database 901 of FIG. 9 and whose model actual size information is 0.8 mm/pixel, and then corrected, and an image to be determined 1103 including a plurality of defect attributes determined using a selected model, which is registered in the database 901 of FIG. 9 and whose model actual size information is 1.0 mm/pixel, and then corrected. Then, for example, when the user selects a defect 1104 in the image to be determined 1102 in the integration screen 1101 of FIG. 11A by operating the input device 105 and then operates a confirmation button 1105, attributes of a plurality of defects of the image to be determined 1102 are integrated with the attributes of the defect 1104. By repeating the above process, a database in which attributes of defects are integrated for each defect ID of FIG. 10B is generated. A pre-integration attribute may be added to a post-integration database.

In addition, when the image actual size information obtained in step S802 includes image actual size information in the vertical and horizontal directions, as in the integration screen 1106 illustrated in FIG. 11B, the image to be determined 1107 including a plurality of defect attributes determined using a model, which is in the database 901 in FIG. 9 and has been selected based on image actual size information in the vertical direction and whose model actual size information is 0.8 mm/pixel, and then corrected, and the image to be determined 1108 including a plurality of defect attributes determined using a model, which is in the database 901 in FIG. 9 and has been selected based on image actual size information in the horizontal direction and whose model actual size information is 1.0 mm/pixel, and then corrected, are displayed. Then, for example, when the user selects a vertical or horizontal defect by operating the input device 105 and then operates the confirmation button 1105 for the image to be determined 1107 and/or the image to be determined 1108 as in the integration screen 1106 of FIG. 11B, a plurality of defect attributes of the image to be determined 1107 and/or the image to be determined 1108 are integrated. In this case, a direction of a defect is determined from the start point coordinates 1004 and the end point coordinates 1005 registered in the database 1009 of FIG. 10B, and defects whose directions of image actual size information coincide may be displayed already in a selected state 1109. In this way, it is possible to integrate the defects in the selected state 1109 without the user performing an operation for selecting the defects.

As described above, according to the second embodiment, it is possible to further improve accuracy for determining an attribute of a defect and a scope of image actual size information of an image to be determined. This improves a reliability of processing for determining an attribute of a defect, which makes it possible to optimize inspection work.

Step S803 or S805 may be omitted. For example, the selection of models in step S803 may be omitted, and all determination models may be used. Alternatively, the correction of attributes of a defect in step S805 may be omitted.

Further, when a plurality of pieces of image actual size information are obtained or image actual size information includes image actual size information in the vertical and horizontal directions, it need only be that processing from step S803 to step S805 is performed for each piece of image actual size information.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-173413, filed Oct. 22, 2021 which is hereby incorporated by reference herein in its entirety.

What is claimed is:

1. An image processing apparatus comprising:
a processor; and
a memory, including instructions stored thereon, which when executed by the processer cause the image processing apparatus to:
obtain first actual size information of an image including a defect;
determine an attribute of the defect included in the image using the first actual size information and a model generated by learning in advance;
store a database in which the model generated by learning in advance and second actual size information used for the learning of the model are associated; and
select, based on the first actual size information and the second actual size information, a model for performing the determination from among models generated by learning in advance,
wherein the instructions, when executed by the processor, further cause the apparatus to:
select a plurality of models based on a difference between the first actual size information and the second actual size information, and
integrate attributes of a defect determined using the plurality of models.

2. The image processing apparatus according to claim 1, wherein the instructions, when executed by the processor, further cause the apparatus to:
select a model whose first actual size information is the closest to the second actual size information.

3. The image processing apparatus according to claim 1, wherein the instructions, when executed by the processor, further cause the apparatus to:
correct the attribute of the defect based on the first actual size information and the second actual size information.

4. The image processing apparatus according to claim 3, wherein the instructions, when executed by the processor, further cause the apparatus to:
correct the attribute of the defect based on a ratio of the first actual size information and the second actual size information.

5. The image processing apparatus according to claim 3, wherein the instructions, when executed by the processor, further cause the apparatus to:
store a database in which the defect, a position of the defect, the attribute of the defect, and the corrected attribute of the defect are associated.

6. The image processing apparatus according to claim 1, wherein the instructions, when executed by the processor, further cause the apparatus to:
correct the attributes of the defect determined using the plurality of models based on the first actual size information and the second actual size information.

7. The image processing apparatus according to claim 6, wherein the instructions, when executed by the processor, further cause the apparatus to:
store a database in which the defect, a position of the defect, an attribute of the defect, a corrected attribute of the defect, and a model used for determining the attribute of the defect are associated.

8. The image processing apparatus according to claim 1, wherein
the first actual size information includes actual size information in a vertical direction and a horizontal direction of the image.

9. The image processing apparatus according to claim 8, wherein the instructions, when executed by the processor, further cause the apparatus to
select the model based on the actual size information in the vertical direction and the horizontal direction of the image.

10. The image processing apparatus according to claim 8, wherein the instructions, when executed by the processor, further cause the apparatus to
select the model based on an average of the actual size information in the vertical direction and the horizontal direction of the image.

11. The image processing apparatus according to claim 3, wherein
the first actual size information includes actual size information in a vertical direction and a horizontal direction of the image, and
wherein the instructions, when executed by the processor, further cause the apparatus to:
correct the attribute of the defect based on a ratio of the actual size information in the vertical direction and the horizontal direction of the image and the second actual size information.

12. The image processing apparatus according to claim 3, wherein
the first actual size information includes actual size information in a vertical direction and a horizontal direction of the image, and wherein the instructions, when executed by the processor, further cause the apparatus to:
correct the attribute of the defect based on a ratio of an average of the actual size information in the vertical direction and the horizontal direction of the image and the second actual size information.

13. The image processing apparatus according to claim 6, wherein
the first actual size information includes actual size information in a vertical direction and a horizontal direction of the image, and
wherein the instructions, when executed by the processor, further cause the apparatus to:
integrate the attributes of the defect based on the actual size information in the vertical direction and the horizontal direction of the image and a direction of the defect.

14. The image processing apparatus according to claim 1, wherein the instructions, when executed by the processor, further cause the apparatus to:
resize the image using the first actual size information to determine the attribute of the defect.

15. The image processing apparatus according to claim 1, wherein
the defect is a crack.

16. The image processing apparatus according to claim 15, wherein
the attribute of the defect is a width of the crack.

17. An image processing method comprising:
obtaining first actual size information of an image including a defect;
determining an attribute of the defect included in the image using the first actual size information and a model generated by learning in advance;
storing a database in which the model generated by learning in advance and second actual size information used for the learning of the model are associated;
selecting, based on the first actual size information and the second actual size information, a model for performing the determination from among models generated by learning in advance, wherein the selecting selects a plurality of models based on a difference between the first actual size information and the second actual size information, and
integrating attributes of a defect determined using the plurality of models.

18. A non-transitory computer-readable storage medium storing a program for causing a computer to execute an image processing method comprising:
obtaining first actual size information of an image including a defect;
determining an attribute of the defect included in the image using the first actual size information and a model generated by learning in advance;
storing a database in which the model generated by learning in advance and second actual size information used for the learning of the model are associated;
selecting, based on the first actual size information and the second actual size information, a model for performing the determination from among models generated by learning in advance, wherein the selecting selects a plurality of models based on a difference between the first actual size information and the second actual size information, and
integrating attributes of a defect determined using the plurality of models.

* * * * *